Inventor
Irving C. Jennings

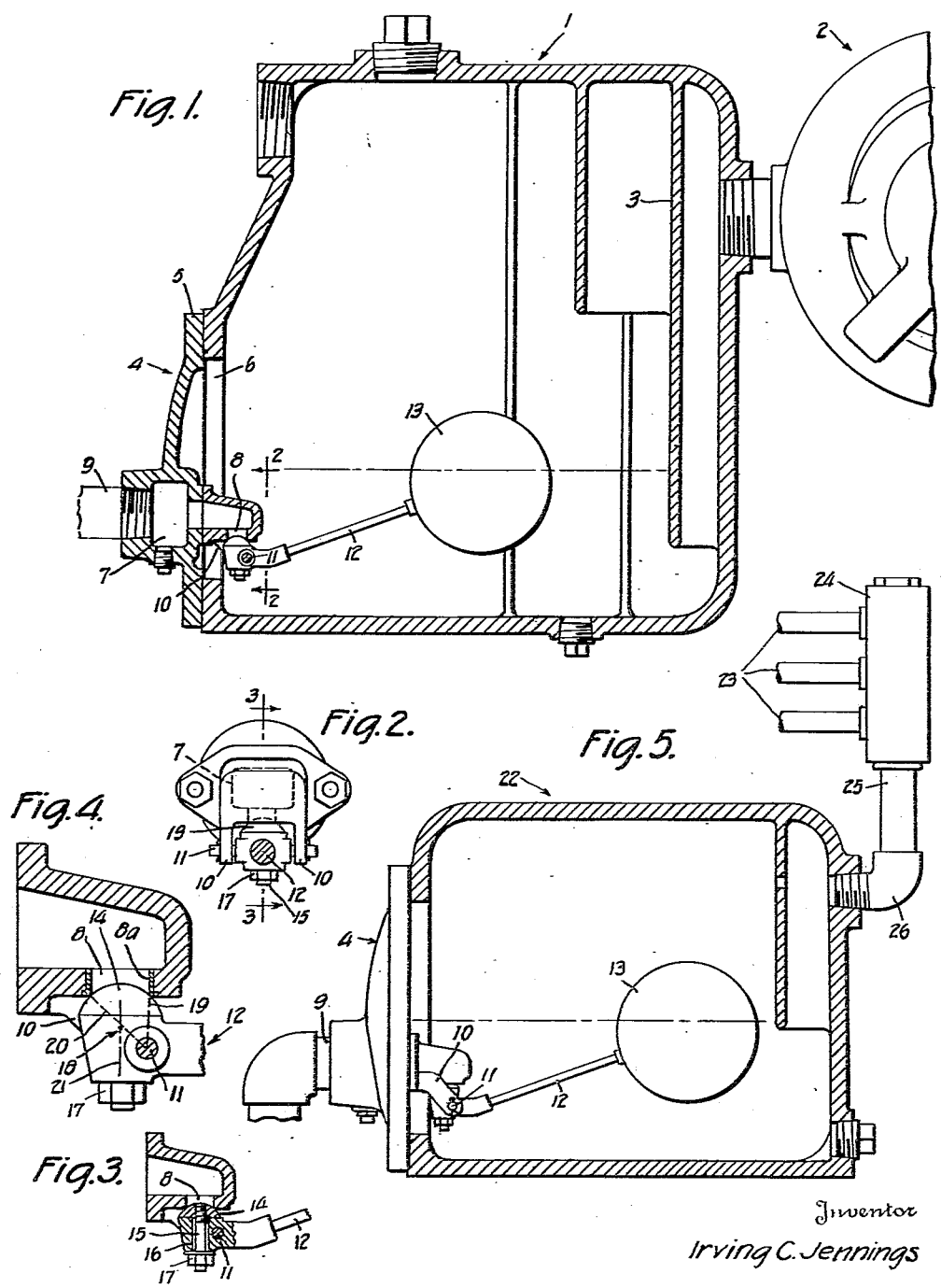

United States Patent Office

2,794,445
Patented June 4, 1957

2,794,445

LIQUID LEVEL CONTROL VALVES

Irving C. Jennings, South Norwalk, Conn.

Application September 6, 1952, Serial No. 308,197

4 Claims. (Cl. 137—434)

This invention relates to liquid level control valves adapted for use in any circumstances where accumulating liquid is to be automatically discharged at a predetermined level, or where liquid subject to depletion is to be automatically replenished at a predetermined level. The invention has many uses. It is conspicuously useful for discharging liquid from the separator of a hydroturbine pump of the well known Nash type.

In the operation of a Nash type liquid ring compressor, a certain amount of cooling liquid is transmitted continuously through the compressor and is discharged with the air compressed. This liquid is removed from the compressed air in a separator or receiver furnished with baffles or other means for effecting separation. The liquid accumulates in the bottom of the separator and is desirably returned automatically for reuse to the source from which it came.

There has been a continuing effort for many years to provide a satisfactory float valve for controlling the discharge of the liquid from the separator, but up to the present time there has been more or less trouble with all these devices. The chief difficulty lies in the fact that relatively large amounts of liquid have to be removed, which means that a fairly large orifice or port must be provided to pass the requisite quantity of liquid when the pressure in the separator is low. When the pressure is high, the valve is held tightly closed because of the large size of the orifice, and the lifting power of the float must be multiplied many times in order to lift the valve from its seat. The use of compound levers, pins sliding in a slot, and other devices are all subject to the disadvantages of wear, friction and clogging, which soon put the valve out of commission.

It is also necessary for the valve to have a certain amount of play in order for it to form a tight and even joint with its seat. It has been customary to provide guides on the end of the valve for leading it into the discharge orifice. Such arrangements restrict the flow area of the orifice and promote the lodgement of dirt or other deleterious substances which tend to plug up the valve.

It is a primary object of the invention to provide an improved float valve in which all these difficulties are overcome or avoided.

In the opposite case, where the valve is to control replenishment of liquid at a predetermined level, nearly all of the considerations mentioned above apply. The novel valve is notably useful in the water supply tank of a sewage ejector and in the familiar toilet flush tank.

The novel valve, according to a practical and advantageous embodiment of the invention, combines the following features. It is self-centering in the orifice without the aid of extraneous guiding means. It is mounted to move to and from its seat with a wiping action. It is mounted to move obliquely from the seat in an arcuate path to provide a pronounced mechanical advantage in favor of the float in the initial stage of the opening movement. It provides a separate valve head of corrosion- and wear-resisting material which can be readily and inexpensively replaced. It provides a valve head mounting on one of the arms of the float valve lever which permits the head automatically to find its proper position on the arm before it is fixed in place on the arm.

To the attainment of the above ends, the novel valve is characterized by the following features. A head formed substantially as a segment of a sphere, and composed of corrosion resistant material, such as Monel metal or stainless steel, is provided. The head has connected to it a threaded stem which passes freely through a bore of the float lever arm upon which it is to be adjustably and removably mounted. A nut, threaded on the stem, clamps the head in an adjusted position determined by the engagement of the head with the valve seat. The desired mechanical advantage as well as the desired wiping action is provided for by pivotally mounting the float lever substantially in line with one edge of the seat in a plane at right angles to the seat, and at a point substantially removed from the plane of the seat. The location of the pivot is so chosen, however, that a line joining the pivot with the remote edge of the seat will pass between the seat and the center of curvature of the valve head surface.

Other objects and advantages will hereinafter appear.

In the drawing forming part of this specification,

Figure 1 is a view in sectional elevation of a Nash pump showing the novel mechanism of the present invention mounted in the separator thereof;

Figure 2 is a sectional detail view, the section being taken upon the line 2—2 of Figure 1, looking in the direction of the arrows;

Figure 3 is a further sectional detail view taken upon the line 3—3 of Figure 2, looking in the direction of the arrows;

Figure 4 is a view generally like Figure 3 but on a larger scale, with certain lines added to emphasize geometrical features of the construction;

Figure 5 is a view in sectional elevation showing the invention applied to a steam trap associated with steam coils.

Figure 6:
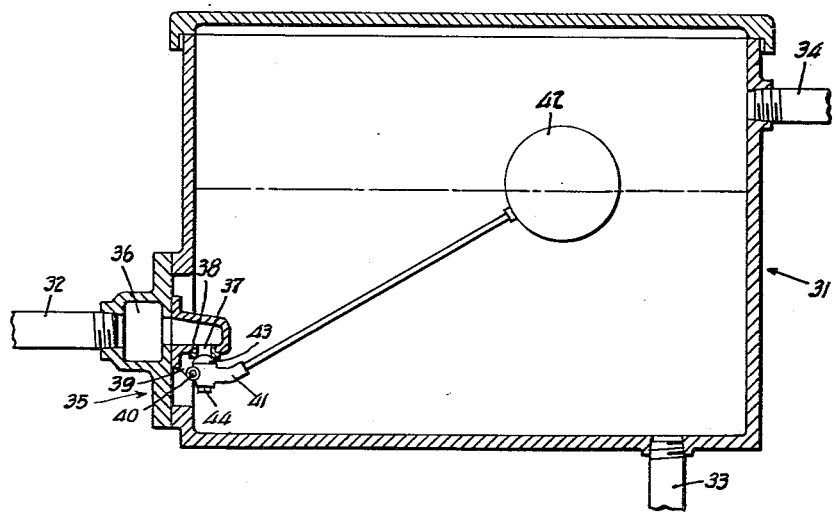
Figure 6 is a view similar to Figure 1, showing a valve embodying the invention applied to control the replenishment of liquid to a constant level, liquid supply tank.

In Figure 1 a separator 1 is shown connected to a Nash compressor 2. Baffle plates 3 act to separate the water from the air. A float valve unit 4 comprises a supporting plate 5 which extends across and covers an opening 6 formed in a wall of the container or separator 1. The plate 5 is removably attached to the separator wall. The plate 5 is formed with an internal passage 7 which is entered through an inlet port 8 and which discharges into a pipe 9. The valve seat coincides with the edge of the port 8 and is provided upon a replaceable insert bushing 8a.

The plate also includes downwardly inclined arms 10 which support the pivot pin 11 of a float lever 12. One arm of the lever 12 carries a ball float 13. The other arm is designed to support adjustably and removably a valve head 14. The head 14, which is of corrosion-resisting material such as Monel metal or stainless steel, is formed as a segment of a sphere, having a parti-spherical outer face and a flat inner face. A threaded stem 15 is secured to the head and extends downward from the flat face thereof through a bore 16 formed in the valve arm of the lever 12. A nut 17 is threaded onto the lower end of the stem 15 to press the valve head firmly in place on the arm. The bore 16 is of considerably larger diameter than the stem 15. Before the nut 17 is tightened the ball 13 is depressed to force the valve head against its seat. The valve head automatically centers itself with reference to the seat and is then fixed in place by tightening of the nut. There is a slight play around the pin 11 which permits the spherical valve 8 always to make contact all around the orifice 9.

In Figure 4 the center of curvature of the valve head is indicated at 18, radial lines 19 and 20 are drawn from the axis of the pin 11 to the nearest and farthest points of the valve seat, and the center line 21 of the valve is indicated, all for the purpose of showing certain geometrical features of the construction and mounting of the valve.

It will be observed that the axis of the pin 11 is located substantially in line with the nearest point of the valve seat and at a distance from that point substantially equal to the width of the port 8. Thus the radial line 19 extends substantially parallel to the center line 21 while the radial line 20 intersects the center line 21 at about 45°. As a result of this arrangement the portion of the valve surface through which the radial line 19 passes is moved into and out of engagement with the seat in a direction almost parallel to the seat, while the portion of the valve surface through which the radial line 20 passes moves into and out of engagement with the seat at an angle of about 45° with the seat. In either case a good wiping action is realized.

It is also evident that the valve is not pulled directly away from the seat so as to oppose directly the liquid pressure tending to hold the valve closed, but that it is moved away gradually at first and with an increasing component in the direction of the center line 21. It is also important that when the valve is fully seated the center of curvature 18 lies outside the radial line 20, since this enables the valve to move smoothly and directly to its seat without any hump to get over. Otherwise expressed, the fulcrum axis must be less than twice as far from the plane of the valve seat as the distance from the center of curvature of the valve to the plane of the valve seat when the valve is in closed position.

The valve head, being of wear and corrosion-resisting material, will be long lived. It can, however, be readily removed and replaced if desired. The fact that the entire valve mechanism is carried on the plate 5 makes possible the removal of the valve structure as a unit for valve head replacement, and the centering of the new valve head as described, before replacement of the unit in the separator.

In Figure 5 the same valve unit 4 is employed as that disclosed in Figures 1 to 4, but the unit is applied to a steam trap 22 which receives condensation from steam pipes 23. The pipes 23 are shown connected with the trap 22 through a header 24, a pipe 25 and an elbow 26. The purpose of this showing is simply to illustrate the fact that the valve mechanism as disclosed is useful in any situation where accumulating liquid is to be discharged so as to maintain a substantially constant water level.

In Figure 6 a constant liquid level supply tank 31 is fed through a pipe 32 and discharges through a pipe 33. A vent pipe 34 is also provided. The pipe 32 is threaded into a plate 35 which is generally similar to the plate 5 and which, like the plate 5, removably covers an opening in a side wall of the associated tank. The plate 35 has a passage 36 formed through it which discharges through an orifice 37 into the tank 31. The orifice 37 is provided in a removable bushing 38, which bushing is formed with a valve seat at its lower side. The plate 35 also includes arms 39 which support a pivot pin 40 of a valve lever 41. The lever 41 carries at its free end a ball float 42.

In this instance the lever is a lever of the second class, a valve 43 being provided comparatively near to the fulcrum between the fulcrum and the ball float 42. Being a lever of the second class, the valve arm is included in the ball arm. The valve 43 is of the same construction as the valve 14, and is similarly mounted. The valve 14 includes a stem which passes loosely through the lever 41. A nut 44 threaded onto the stem is tightened to clamp the valve 43 securely in place on the lever after the valve has centered itself with reference to the valve seat.

As before, the lever fulcrum is substantially in line with the nearest point of the valve seat and is substantially removed from the plane of the valve seat. In this instance, however, the point of the valve seat nearest to the fulcrum is at the side of the valve seat remote from the ball float. A line drawn through the lever fulcrum to the farthest point of the valve seat will pass between the valve seat and the center of curvature of the valve head. The same easy and accurate movement to and from a fully seated condition is realized, and the same wiping action is obtained as in the embodiments of Figs. 1 to 5.

In this instance, as will be evident, the valve is opened by a fall of water level and is closed by a rise of water level. Thus, when the water falls below a prescribed level replenishment water is admitted until the deficiency has been made up.

I have described what I believe to be the best embodiments of my invention. I do not wish, however, to be confined to the embodiments shown, but what I desire to cover by Letters Patent is set forth in the appended claims.

I claim:

1. In float valve mechanism, in combination, a ported member having a valve seat, a lever, means providing a fulcrum support for the lever adjacent to said seat, said lever having a float arm and a valve arm, the valve arm having a passage through it, and a valve member having a substantially parti-spherical head and a stem projecting from the head through the valve arm passage, the passage being of large enough bore to clear the stem by a substantial amount in all transverse directions, and means accessible and operable when the valve head is closed against the valve seat for releasably clamping the valve member in fixed relation to the valve arm, the construction and arrangement being such that the valve member can be adjusted, when unclamped, to find its proper center relative to the seat by engagement of the valve head with the seat, and can then be clamped to fix the adjustment while the valve member is held centered by engagement of the head with the seat, the fulcrum axis being disposed in a plane which passes through one edge of the port substantially at right angles to the valve seat, but at a distance substantially removed from the plane of the seat, yet sufficiently near to the seat so that a line drawn from the fulcrum axis to the farthest point of the port edge will not be crossed by the center of curvature of the valve head as the valve moves to and from its seat.

2. In a float valve mechanism, in combination, a ported member having a valve seat, a lever, means providing a fulcrum support for the lever adjacent to said seat, said lever having a float arm and a valve arm, and a valve having a substantially parti-spherical head mounted on the valve arm, the fulcrum axis of the lever being disposed in a plane which passes through one edge of the seat substantially at right angles to the valve seat, at a distance substantially removed from the plane of the seat, yet sufficiently near to the seat so that a line drawn from the fulcrum axis to the farthest point of the seat edge will not be crossed by the center of curvature of the valve head as the valve moves to and from its seat.

3. In a float valve mechanism, in combination, a ported member having a valve seat, a lever, means providing a fulcrum support for the lever adjacent to said seat, said lever having a float arm and a valve arm, the valve arm having a passage through it, and a valve member having a substantially parti-spherical head mounted on the valve arm, the fulcrum axis of the lever being disposed substantially in a plane which passes through one edge of the valve seat substantially at right angles to the plane of the seat, and at a distance from the plane of the seat substantially equal to the width of the port, the fulcrum axis, however, being less than twice as far from the plane of the valve seat as the distance from the center of curvature of the valve to the plane of the valve seat when the valve is in closed position.

4. In a float valve mechanism, in combination, a ported member having a valve seat, a lever, means providing a fulcrum support for the lever adjacent to said seat, said lever having a float arm and a valve arm, and a valve member having a substantially parti-spherical head, mounted on the valve arm, the fulcrum axis being disposed in a plane which passes through one edge of the port substantially at right angles to the valve seat, but at a distance sufficiently removed from the plane of the seat to cause the valve to move to and from the seat at the point of the seat farthest from the fulcrum axis at an angle of not substantially more than forty-five degrees to the plane of the seat, the fulcrum axis, however, being less than twice as far from the plane of the valve seat as the distance from the center of curvature of the valve to the plane of the valve seat when the valve is in closed position.

References Cited in the file of this patent

UNITED STATES PATENTS

| | | |
|---|---|---|
| 679,940 | Bromley | Aug. 6, 1901 |
| 938,470 | Frost | Nov. 2, 1909 |
| 1,235,079 | Supernaw | July 31, 1917 |
| 1,324,844 | Olson | Dec. 16, 1919 |
| 1,551,808 | Dixon | Sept. 1, 1925 |
| 1,556,708 | Osborn | Oct. 13, 1925 |
| 1,601,210 | Haas | Sept. 28, 1926 |
| 1,683,171 | Dickey | Sept. 4, 1928 |
| 1,686,849 | Frauenheim | Oct. 9, 1928 |
| 1,868,522 | Crispin | July 26, 1932 |
| 1,898,389 | Pendleton | Feb. 21, 1933 |

FOREIGN PATENTS

| | | |
|---|---|---|
| 10,856 | Great Britain | Aug. 25, 1886 |